(12) United States Patent
Glickman et al.

(10) Patent No.: US 8,909,905 B2
(45) Date of Patent: Dec. 9, 2014

(54) METHOD FOR PERFORMING PLURALITY OF BIT OPERATIONS AND A DEVICE HAVING PLURALITY OF BIT OPERATIONS CAPABILITIES

(75) Inventors: Eran Glickman, Reshon Letzion (IL); Evgeni Ginzburg, Petah Tikva (IL); Noam Sheffer, Tel Aviv (IL)

(73) Assignee: Freescale Semiconductor, Inc., Austin, TX (US)

( * ) Notice: Subject to any disclaimer, the term of this patent is extended or adjusted under 35 U.S.C. 154(b) by 1087 days.

(21) Appl. No.: 12/377,351

(22) PCT Filed: Aug. 18, 2006

(86) PCT No.: PCT/IB2006/052861
§ 371 (c)(1),
(2), (4) Date: Feb. 12, 2009

(87) PCT Pub. No.: WO2008/020271
PCT Pub. Date: Feb. 21, 2008

(65) Prior Publication Data
US 2010/0223444 A1    Sep. 2, 2010

(51) Int. Cl.
*G06F 15/00* (2006.01)
*G06F 7/38* (2006.01)
*G06F 9/00* (2006.01)
*G06F 9/44* (2006.01)
*G06F 9/30* (2006.01)

(52) U.S. Cl.
CPC .......... *G06F 9/30018* (2013.01); *G06F 9/3001* (2013.01)
USPC .......................................... 712/222; 712/224

(58) Field of Classification Search
None
See application file for complete search history.

(56) References Cited

U.S. PATENT DOCUMENTS

| | | | |
|---|---|---|---|
| 4,334,268 A | 6/1982 | Boney et al. | |
| 4,409,653 A | 10/1983 | Bruce, Jr. | |
| 4,451,885 A | 5/1984 | Gerson et al. | |
| 5,033,025 A | 7/1991 | Padgaonkar | |
| 5,367,690 A | 11/1994 | Schiffleger | |
| 5,410,660 A | 4/1995 | Divine et al. | |
| 5,802,602 A | 9/1998 | Rahman et al. | |
| 5,832,288 A * | 11/1998 | Wong | 712/5 |
| 5,860,085 A | 1/1999 | Stormon et al. | |
| 5,913,049 A * | 6/1999 | Shiell et al. | 712/215 |
| 6,049,863 A | 4/2000 | Tran et al. | |

(Continued)

FOREIGN PATENT DOCUMENTS

| | | |
|---|---|---|
| GB | 2360375 A | 9/2001 |
| JP | 64-019430 | 1/1989 |

(Continued)

OTHER PUBLICATIONS

PCT/IB2006/052861 International Search Report and Written Opinion, May 2007.

*Primary Examiner* — George Giroux

(57) ABSTRACT

A method and a device having a plurality of bit operations capability, the device includes: a first and a second registers and an instruction fetch circuit, and an arithmetic logic unit adapted to: calculate, during a first clock cycle, a position value representative of a position, within a first information vector, of a first bit of information that has a first value; and to multiply the position value by a multiplication factor to provide a first result and to alter the value of the first bit to a second value to provide an updated information vector, during the first clock cycle.

20 Claims, 4 Drawing Sheets

(56) References Cited

U.S. PATENT DOCUMENTS

| | | | |
|---|---|---|---|
| 6,061,780 A * | 5/2000 | Shippy et al. | 712/204 |
| 6,134,649 A | 10/2000 | Witt | |
| 6,484,251 B1 | 11/2002 | McDonald et al. | |
| 2002/0087955 A1 * | 7/2002 | Ronen et al. | 717/151 |
| 2003/0005268 A1 | 1/2003 | Catherwood | |
| 2004/0153617 A1 | 8/2004 | Motta | |
| 2005/0262403 A1 | 11/2005 | Palus | |

FOREIGN PATENT DOCUMENTS

| | | |
|---|---|---|
| JP | 06-180673 | 6/1997 |
| JP | 2000010772 | 1/2000 |
| WO | 9112576 A1 | 8/1991 |
| WO | 9429790 A1 | 12/1994 |

* cited by examiner

| First field 161 | Information vector location field 162 | First result target field 163 | Multiplication factor field 164 |

FIG. 2

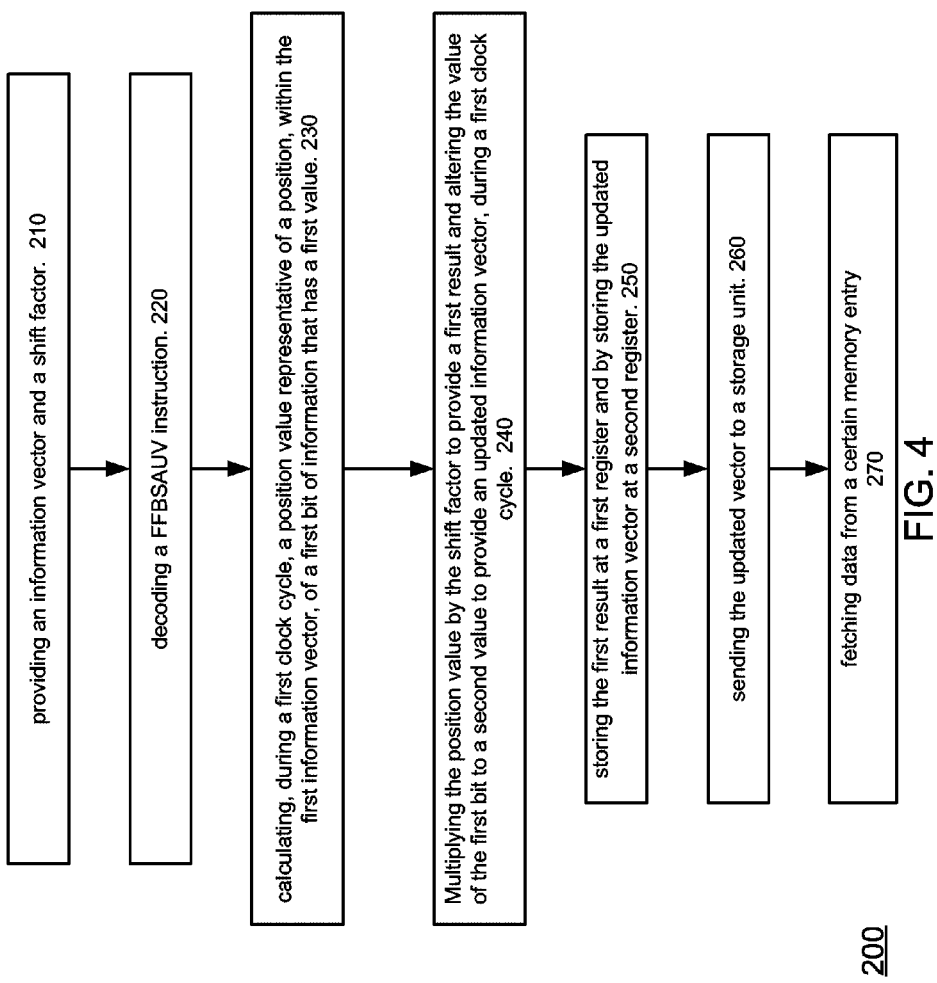

METHOD FOR PERFORMING PLURALITY OF BIT OPERATIONS AND A DEVICE HAVING PLURALITY OF BIT OPERATIONS CAPABILITIES

FIELD OF THE INVENTION

The present invention relates to methods for performing a plurality of bit operations and a device having plurality of bit operations capabilities.

BACKGROUND OF THE INVENTION

Memory units can be arranged in various manners. Some memory management schemes associate a validity tag or validity bit with each memory segment in order to indicate whether that memory segment stores valid data. This memory management scheme can be implemented in cache memory units but this is not necessarily so.

Typically, a multiple-bit information vector indicates which data segments out a sequence of memory segments are valid. The segment can include one or more memory entries.

After a certain memory segment is read it should be labeled invalid, thus the corresponding bit should be reset.

If, for example, the memory segments represented by the information vectors are stored in a consecutive manner then the locations of the corresponding bits within the vectors indicate where these memory segments are located.

Typically, in order to fetch a memory segment and update the information vector three instructions were required. The following exemplary code illustrates these three instructions: (i) find first set bit in information vector and store the position value in a register; (ii) clear the first set bit, and (iii) multiply the content of the register by a multiplication factor to find the location of memory segment that corresponds to the first bit. The execution of these instructions requires many processor cycles and slow down the execution of a very commonly executed set of instructions.

There is a need to provide efficient methods for performing a plurality of bit operations and devices having a plurality of bit operations capability.

SUMMARY OF THE PRESENT INVENTION

A method for performing a plurality of bit operations and a device having plurality of bit operations capabilities, as described in the accompanying claims.

BRIEF DESCRIPTION OF THE DRAWINGS

The present invention will be understood and appreciated more fully from the following detailed description taken in conjunction with the drawings in which:

FIG. 2 illustrates an instruction, according to an embodiment of the invention;

FIG. 4 is a flow chart of a method, according to an embodiment of the invention.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

Figure 1:
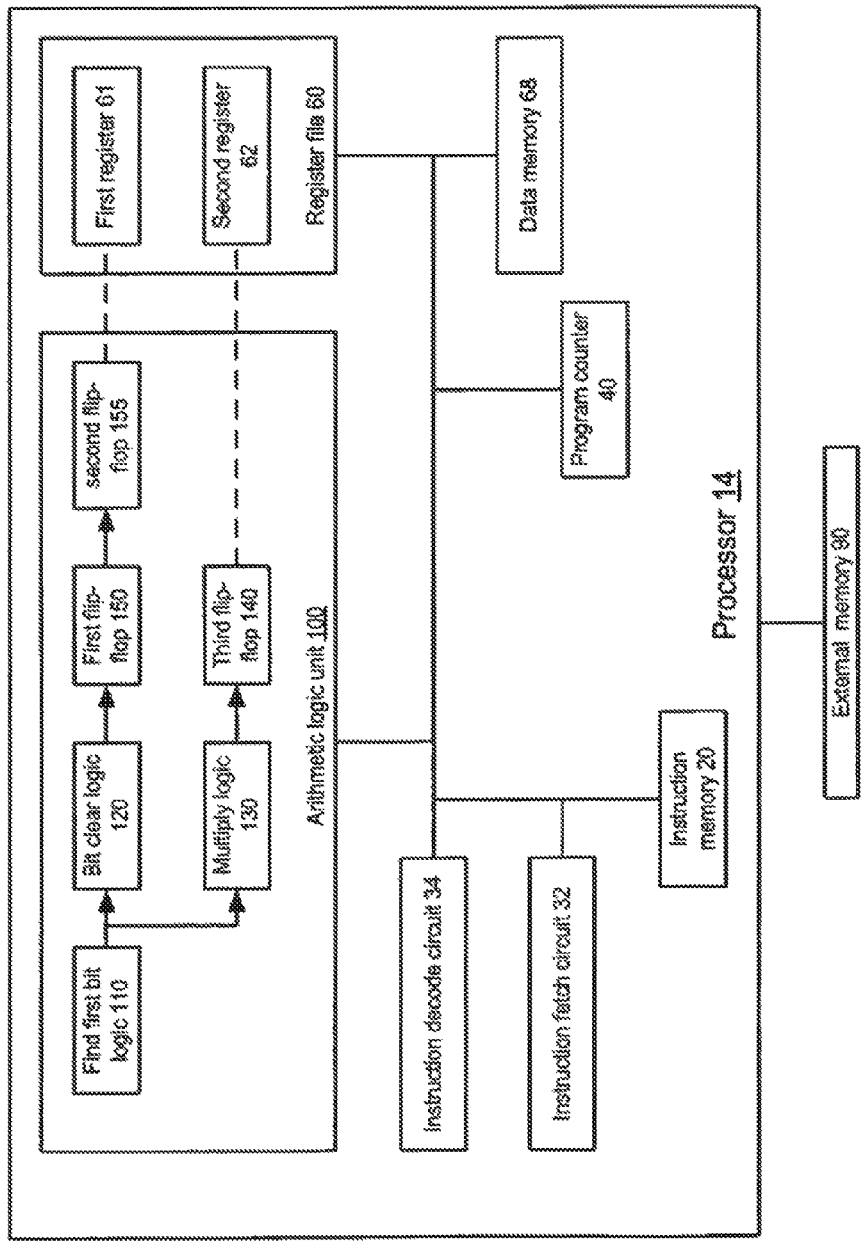
FIG. 1 illustrates a device, according to an embodiment of the invention.

FIG. 1 illustrates device 10 according to an embodiment of the invention.

Device 10 can include one or more integrated circuits, multiple integrated circuits. Device 10 can be a mobile phone, a personal data accessory, a media player, a computer, a controller and the like. Those of skill in the art will appreciate that device 10 can include many circuits that are not illustrated in FIG. 1. Alternatively, Device 10 can include fewer components than those that are illustrated in either one of the following drawings or include other components.

Device 10 is capable of performing a plurality of bit operations that include a "find first value" operation, "bit clear" operation and a multiply operations, although other operations might be added or replace the above mentioned operations. Each operation can be initiated by a dedicated instruction but conveniently, a single find first value, multiply and update vector (FFVMAUV) instruction can cause device 10 to execute a combination of these bit operations.

It is noted that the multiply operation can be performed by a shift operation, especially if the multiplication factor is a power of two.

Device 10 includes processor 14 and multiple external components such as external memory 90.

Processor 14 is conveniently a four-staged pipeline Reduced Instruction Set Computer (RISC) processor. The pipeline includes a fetch stage, a decode stage, an execute stage and one or more write back stage.

Processor 14 includes registers set 60 that may include multiple registers such as first register 61 and second register 62. Processor 14 also includes an instruction fetch circuit 32, an instruction decode circuit 34, arithmetic logic unit 100 and data memory 68.

Arithmetic logic unit 100 is connected to instruction decode circuit 34, to register set 60, to data memory 68. Instruction fetch circuit 32 is connected to register set 60 and to instruction memory 20.

It is noted that processor 14 can be connected to various peripherals, data and control busses, DMA controller, other processors and the like.

Arithmetic logic unit 100 is adapted to: (i) calculate, during a first clock cycle, a position value representative of a position, within a first information vector, of a first bit of information that has a first value, (ii) multiply the position value by a multiplication factor to provide a first result and, (iii) alter the value of the first bit to a second value to provide an updated information vector, during a first clock cycle.

Arithmetic logic unit 100 conveniently has a first input for receiving from instruction decode circuit 34 a multiplication factor and a second input for receiving from instruction decode circuit 34 the first information vector. Conveniently, the FFVMAUV instruction indicates where the first information vector is located and what is the multiplication factor. The FFVMAUV instruction can include the multiplication factor or can indicate where it is stored.

The FFVMAUV instruction can point to a register (out of register set 60) that stores the first information vector, can point to a register that stores a pointer to a memory entry that stores the first information vector or can otherwise point to a memory entry that stores the first information vector.

The inventors used a FFVMAUV instruction that included the multiplication factor as well as an indication of which register stores the first information vector. The result of the decode stage of the FFVMAUV instruction is a provision of the multiplication factor and the first information vector to arithmetic logic unit 100. It is noted that instruction decode circuit 34 can be connected to arithmetic logic unit 100 via two flip-flops (or other temporal storage components) that receive the multiplication factor and the first information vector. These flip-flops are sampled at the beginning of the execute phase of the FFVMAUV instruction.

Conveniently, arithmetic logic unit 100 includes find first value logic 110, bit update logic 120 and multiply logic 130. Find first value logic 110 receives the first information vector. It calculates, during a first clock cycle, a position value representative of a position, within a first information vector, of a first bit of information that has a first value. Conveniently the first value is a high value ("1") and find first value logic 110 locates the first bit that is set in the first information vector, the first value may also be a low value ("0").

This position value is fed to bit update logic 120 and to multiply logic 130. Multiply logic 130 is adapted to multiply, during the first clock cycle, the position value by a multiplication factor to provide a first result.

Conveniently, the multiplication involves shifting the position value. If, for example the multiplication factor is two by the power of K then the shifting includes shifting the position value by K steps to the left.

Conveniently, the first result is used as an index to a certain memory entry. Conveniently the multiplication factor indicates the length of a single memory entry that can store valid information.

It is noted that the shift operation is an example of a multiply operation. Other multiplication operations of bit operations can also be executed to provide the required result.

Bit update logic 120 is adapted to alter, during the first clock cycle, the value of the first bit to a second value such as to provide an updated information vector. Conveniently the first value is a high value ("1") and the bit update logic 120 resets that first bit.

The updated information vector is sent to first register 61 and the first result is send to second register 62. It is noted that any registers of register 60 can be selected to store the first result or the updated information vector. Conveniently, the updated information vector replaces the first information vector. This replacement can include sending the updated information vector to the memory unit that previously stored the first information vector.

Conveniently, bit update logic 120 is connected to first register 61 via two flip-flops 150, 155 and multiply logic 130 is connected via third flip-flop 140 to second register 62. This allows the arithmetic logic unit 100 to output the first result during a second clock cycle and to output the updated information vector during a third clock cycle. It is noted that this is not necessarily so and that multiple arithmetic logic unit outputs can enable to output these results simultaneously. It is further noted that the updated information vector can be outputted before the first result is outputted.

According to an embodiment the bits of the first information vector represents a validity of data within different memory entries. The order of the bits in the first information vector represents their priority. Accordingly, if the most significant bit represents the highest priority memory entry than find first bit logic searches for the first bit (having a first value) from left to right.

In this case the first result is an index to the most prioritized valid memory entry. It is noted that that memory entry can be accessed after performing an optional operation of adding the first result to a base address. The processor 14 then can fetch that entry from a memory unit such as memory unit 90.

Processor 14 can store a sequence of instructions that will cause it to repeat an execution of the FFVMAUV instruction until the information vector is cleared (includes only bits having a second value).

FIG. 2 illustrates FFVMAUV instruction 160, according to an embodiment of the invention.

The following description uses terms such as first register and second register. Conveniently these are general-purpose registers out of a register set of a processor.

Single find first value, multiply and update vector (FFVMAUV) instruction 160 includes first field 161, information vector location field 162, first result target field 163 and multiplication factor field 164 that stores the multiplication factor.

First field 161 includes a code that indicates that instruction 160 is a FFVMAUV instruction.

Information vector location field 162 indicates the location of the first information vector. It can also indicate where to store the updated information vector. It is noted that if the updated information vector should be stored in a location that differs from the location of the first information vector than instruction FFVMAUV can include another information source location field. Referring to the example illustrated above the information vector location field 162 points to first register 61.

First result target field 163 indicates where to store the first result. Referring to the example illustrated above the first target field 163 points to second register 62.

Figure 3:
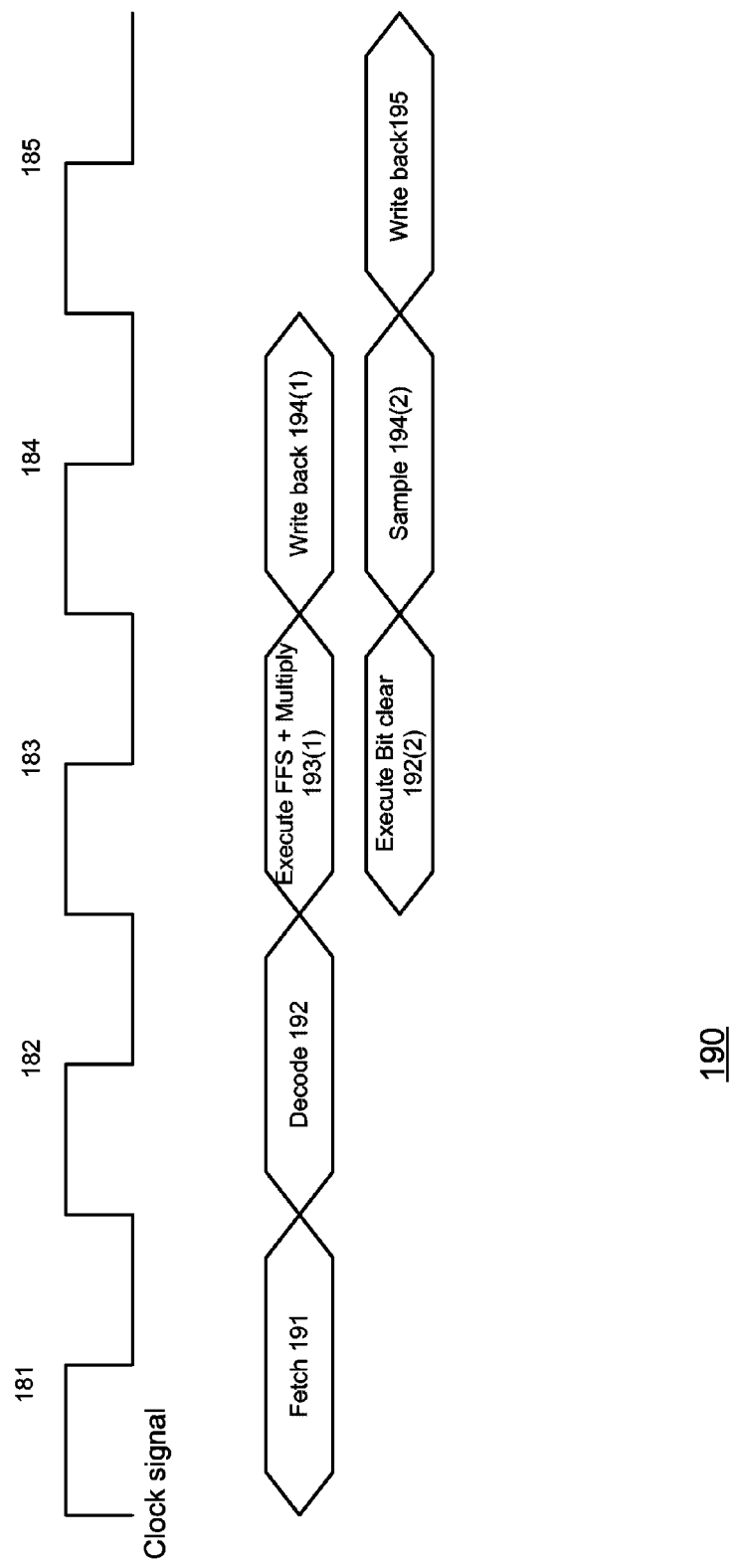
FIG. 3 illustrates a timing diagram, according to an embodiment of the invention.

FIG. 3 illustrates a timing diagram 180, according to an embodiment of the invention.

Timing diagram 180 illustrates the execution of a FFVMAUV instruction during fife phases (five clock cycles).

During clock cycle 181 the FFVMAUV instruction is fetched, as illustrated by box 191 ("fetch").

During clock cycle 182 the FFVMAUV instruction is decoded, as illustrated by box 192 ("decode"). The decoding include providing the multiplication factor and the first information vector arithmetic logic unit 100 or at least preparing this information such that during the next clock cycle the arithmetic logic unit 100 can process this information.

During clock cycle 183 (also referred to as first clock cycle) the arithmetic logic unit 100 executes the FFVMAUV instruction. Especially it calculates a position value representative of a position within a first information vector, of a first bit of information that has a first value and also multiplies the position value by a multiplication factor to provide a first result. This is indicated by box 193(1) ("Execute FFS+Multiply"). In addition it also alters the value of the first bit to a second value to provide an updated information vector, as indicated by box 193(2) ("Execute Bit clear").

During clock cycle 184 (also referred to as second clock cycle) the arithmetic logic unit 100 sends the first result to second register 62, as indicated by box 194(1) ("Write back"). The updated information vector is sent to a flip-flop, as indicated by box 194(2) ("sample").

During clock cycle 185 (also referred to as third clock cycle) the updated information vector is sent from the flip-flop to first register 61, as indicated by box 195 ("Write back").

It is noted that FIG. 3 illustrates a sequential operation defined by a certain four-staged RISC. Those of skill in the art will appreciate that the timing diagram may change dependant on the RISC used. The timing diagram may change if the RISC is capable of performing more then one instruction per clock cycle or if it stops the command, jumps and returns later to finish it.

FIG. 4 is a flow chart of method 200 according to an embodiment of the invention.

Method 200 starts by stage 210 of providing an information vector and a multiplication factor. The information vector 210 can be stored in a certain register.

Stage 210 is followed by stage 220 of decoding a FFVMAUV instruction. Stage 220 can also include fetching the FFVMAUV instruction by a fetch unit of a pipelined processor such as a pipelined RISC processor.

Stage 220 is followed by stage 230 of calculating, during a first clock cycle, a position value representative of a position, within the first information vector, of a first bit of information that has a first value.

Stage 230 is followed by stage 240 of multiplying the position value by the multiplication factor to provide a first result and altering the value of the first bit to a second value to provide an updated information vector, during a first clock cycle.

Conveniently, stage 240 includes shifting to the left the position value.

Stage 240 is followed by stage 250 of storing the first result at a first register and by storing the updated information vector at a second register.

Conveniently, stage 250 of storing includes storing the first result at a first register during a second clock cycle and storing the updated information vector at a second register during a third clock cycle.

Stage 250 is followed by stage 260 of sending the updated vector to a storage unit.

Stage 260 is followed by stage of 270 of fetching data from a certain memory entry. That certain memory entry is represented by the first bit that was found during stage 230. Conveniently, the bits of the first information vector represent a validity of data within different memory entries, thus the first bit that was found during stage 230 points to a memory entry (possibly having a highest priority) that stored valid data.

Conveniently, stage 270 of fetching includes calculating an address of the memory entry represented by the first bit in response to the first result. The first result can represent an offset from a predefined base address.

Conveniently, the first value is a high value ("1") and stage 230 of altering includes resetting (clearing) the first bit.

Conveniently, stages 210-270 are repeated until the first information vector includes only bits having a second value.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A method for performing a plurality of bit operations; the method comprises:
providing an information vector;
calculating, during a first clock cycle, a position value representative of a position, within the first information vector, of a first bit of information that has a first value;
multiplying, the position value by a multiplication factor to provide a first result and altering the value of the first bit to a second value to provide an updated information vector, during the first clock cycle;
storing, during a second clock cycle, the first result at a first register; and
storing, during a third clock cycle, the updated information vector at a second register.

2. The method according to claim 1 wherein bits of the first information vector represent a validity of data within different memory entries and wherein the multiplying is followed by fetching data stored within a memory entry represented by the first bit.

3. The method according to claim 2 wherein the fetching comprises calculating an address of the memory entry represented by the first bit in response to the first result.

4. The method according to claim 1 wherein the providing is followed by decoding a find first bit, multiply and update vector instruction.

5. The method according to claim 1 wherein the first value is a high value and wherein the altering comprises resetting the first bit.

6. The method according to claim 1 wherein the providing, calculating and multiplying are repeated until the first information vector comprises only bits having the second value.

7. The method according to claim 1 wherein altering the value of the first bit comprises altering only the value of the first bit to the second value.

8. A device having a plurality of bit operations capabilities, the device comprises:
a register file including a first register and a second register, and an instruction fetch circuit;
an arithmetic logic unit adapted to:
calculate, during a first clock cycle, a position value representative of a position, within a first information vector, of a first bit of information that has a first value;
multiply, during the first clock cycle, the position value by a multiplication factor to provide a first result;
alter the value of the first bit to a second value to provide an updated information vector, during the first clock cycle;
store the first result at the first register during a second clock cycle; and
store the updated information vector at the second register during a third clock cycle.

9. The device according to claim 8 wherein bits of the first information vector represent a validity of data within different memory entries and wherein the device is adapted to fetch data stored within a memory entry represented by the first bit.

10. The device according to claim 9 wherein the arithmetic logic unit is adapted to calculate an address of the memory entry represented by the first bit in response to the first result.

11. The device according to claim 8 wherein the device comprises instruction decode circuit adapted to decode a find first bit, multiply and update vector instruction.

12. The device according to claim 8 wherein the device is adapted to calculate and multiply until the first information vector comprises only bits having a second value.

13. The device according to claim 8 wherein the arithmetic logic unit comprises a find first bit logic coupled to a bit update logic and to a multiply logic.

14. The device according to claim 13 wherein the bit update logic is coupled to the first register via two flip-flops and wherein the multiply logic is coupled via a third flip-flop to the second register.

15. The device according to claim 8 wherein in altering the value of the first bit, the arithmetic logic unit is further adapted to alter only the value of the first bit to the second value.

16. A device having a plurality of bit operations capabilities, the device comprises:
  a first register, a second register, and an instruction fetch circuit; and
  an arithmetic logic unit adapted to:
    execute a first instruction to multiply, during a first clock cycle, a first position value by a first multiplication factor to provide a first result;
    execute a second instruction to alter, during a second clock cycle, a value of a first bit from a first value to a second value; and
    execute a third instruction to:
      calculate, during a third clock cycle, a second position value representative of a position within an information vector of a bit of information that has the first value;
      multiply, during the third clock cycle, the second position value by a second multiplication factor to provide a second result;
      alter, during the third clock cycle, the value of the bit of information to the second value to provide an updated information vector
      store the second result at a first register during a fourth clock cycle; and
      store the updated information vector at a second register during a fifth clock cycle.

17. The device according to claim 16 wherein bits of the first information vector represent a validity of data within different memory entries and wherein the device is adapted to fetch data stored within a memory entry represented by the first bit of information.

18. The device according to claim 17 wherein the arithmetic logic unit is adapted to calculate an address of the memory entry represented by the first bit in response to the first result.

19. The device according to claim 16 wherein the device comprises instruction decode circuit adapted to decode a find first bit, multiply and update vector instruction.

20. The device according to claim 16 wherein the device is adapted to calculate and multiply until the first information vector comprises only bits having a second value.

* * * * *